United States Patent
Erickson et al.

(10) Patent No.: US 8,164,326 B2
(45) Date of Patent: *Apr. 24, 2012

(54) NON-CONTACT SENSOR SYSTEM AND METHOD FOR VELOCITY DETERMINATION

(75) Inventors: Staffan Erickson, Yellow Springs, OH (US); Eric Cahill, Troy, OH (US); Harald Klode, Centerville, OH (US)

(73) Assignee: Goodrich Corporation, Charlotte, NC (US)

( * ) Notice: Subject to any disclaimer, the term of this patent is extended or adjusted under 35 U.S.C. 154(b) by 528 days.

This patent is subject to a terminal disclaimer.

(21) Appl. No.: 12/372,572

(22) Filed: Feb. 17, 2009

(65) Prior Publication Data

US 2010/0207618 A1    Aug. 19, 2010

(51) Int. Cl.
*G01B 7/14* (2006.01)
(52) U.S. Cl. ......... 324/207.15; 324/207.11; 324/207.16; 324/207.23; 324/207.24; 324/207.25; 324/228
(58) Field of Classification Search ............. 324/207.11, 324/207.15, 207.16, 207.23, 207.24, 207.25, 324/228
See application file for complete search history.

(56) References Cited

U.S. PATENT DOCUMENTS

| | | | |
|---|---|---|---|
| 5,228,541 A | 7/1993 | Plude | |
| 5,444,369 A * | 8/1995 | Luetzow | 324/207.2 |
| 5,594,173 A | 1/1997 | Frey et al. | |
| 5,814,724 A | 9/1998 | Romkee | |
| 5,962,777 A | 10/1999 | Salamat et al. | |
| 6,057,682 A * | 5/2000 | McCurley et al. | 324/207.23 |
| 6,302,241 B1 | 10/2001 | Gronowicz, Jr. | |
| 6,305,234 B1 | 10/2001 | Thies et al. | |
| 6,367,337 B1 | 4/2002 | Schlabach | |
| 6,384,721 B1 | 5/2002 | Paielli | |
| 7,061,231 B2 | 6/2006 | Momose | |
| 7,111,912 B1 | 9/2006 | Ticola | |
| 7,208,945 B2 | 4/2007 | Jones et al. | |
| 7,319,319 B2 | 1/2008 | Jones et al. | |
| 7,319,320 B2 | 1/2008 | Kawashima et al. | |

(Continued)

FOREIGN PATENT DOCUMENTS

EP    1832853    9/2007

(Continued)

OTHER PUBLICATIONS

GB; Search Report dated Jul. 9, 2010 in Application No. GB0922045.0.
GB; Search Report dated Jun. 28, 2010 in Application No. GB0922062.5.

(Continued)

*Primary Examiner* — Roberto Velez
*Assistant Examiner* — Son Le
(74) *Attorney, Agent, or Firm* — Snell & Wilmer L.L.P.

(57) ABSTRACT

A non-contact sensor system is provided that comprises a first sensor element disposed within a first member having an axis Y, and a second member configured to rotate about the axis Y at a value X. The second member is configured to interface with the first member. The non-contact sensor system further comprises a second sensor element disposed on the second member proximate the first sensor element without physically contacting the first sensor element, and the first sensor element and the second sensor element are operatively coupled to facilitate sensing the value X. The non-contact sensor system may be configured to sense velocity, acceleration, and other values.

18 Claims, 5 Drawing Sheets

U.S. PATENT DOCUMENTS

| | | |
|---|---|---|
| 7,345,473 B2 | 3/2008 | Lee |
| 7,541,803 B2 * | 6/2009 | Schafer et al. .......... 324/207.25 |
| 7,750,625 B2 | 7/2010 | Wolschlager et al. |
| 7,808,233 B2 * | 10/2010 | Jensen ..................... 324/207.25 |
| 2003/0085700 A1 | 5/2003 | Momose |
| 2004/0207391 A1 | 10/2004 | Momose |
| 2005/0253576 A1 | 11/2005 | Nyce |
| 2006/0290346 A1 * | 12/2006 | Habenschaden et al. ........................ 324/207.16 |
| 2007/0001666 A1 | 1/2007 | Lee |
| 2007/0138275 A1 * | 6/2007 | Hall .............................. 235/400 |
| 2007/0151322 A1 | 7/2007 | Steinich |
| 2007/0205775 A1 * | 9/2007 | Voelkel et al. ................ 324/662 |
| 2008/0079423 A1 | 4/2008 | Wolf |
| 2009/0102463 A1 * | 4/2009 | May ......................... 324/207.16 |
| 2009/0224766 A1 | 9/2009 | Wang et al. |
| 2009/0229926 A1 | 9/2009 | Schaefer |

FOREIGN PATENT DOCUMENTS

| | | |
|---|---|---|
| GB | 1519403 | 7/1978 |
| WO | 2007137693 | 12/2007 |

OTHER PUBLICATIONS

GB; Search Report dated Jul. 28, 2010 in Application No. GB1004993.0.

USPTO; Office Action dated Jul. 21, 2011 in U.S. Appl. No. 12/372,594.

USPTO; Office Action dated Jun. 2, 2011 in U.S. Appl. No. 12/372,557.

Rueben Wesley Burnham, "Mathematics for Mcahinests," John Wiley and Sons, 1st Edition, 1915, New York, p. 137.

* cited by examiner

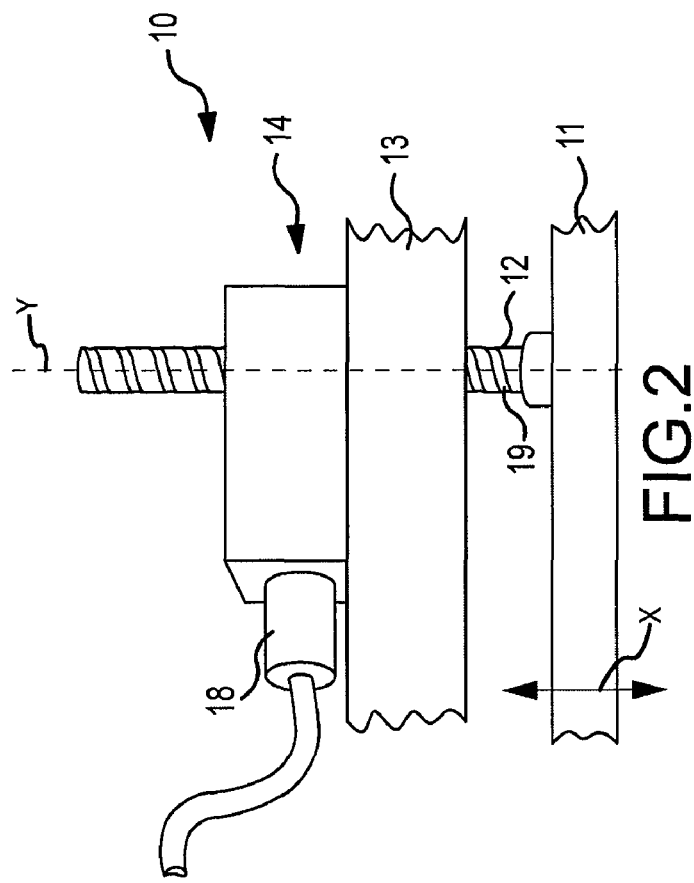
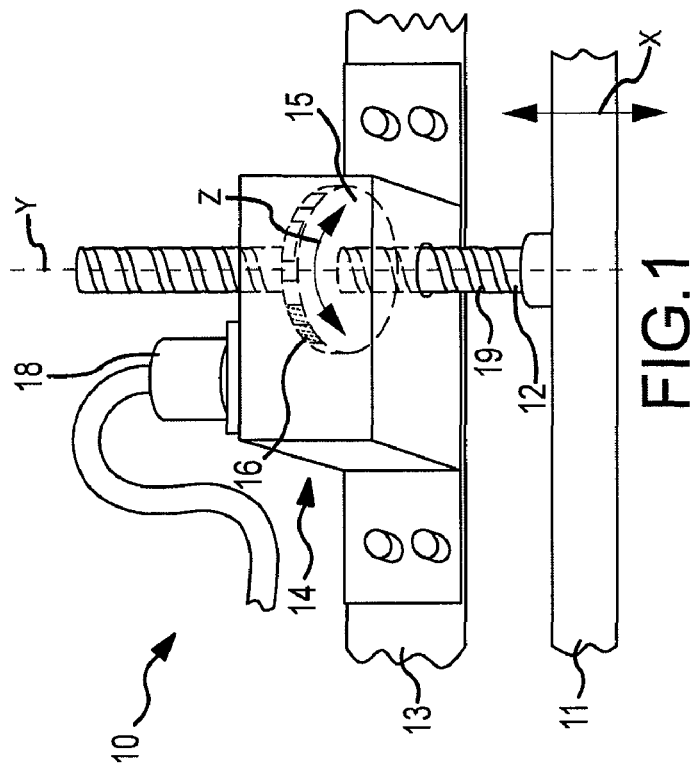
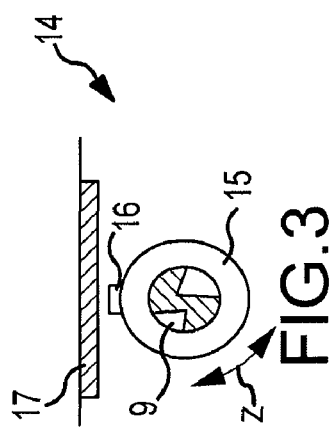

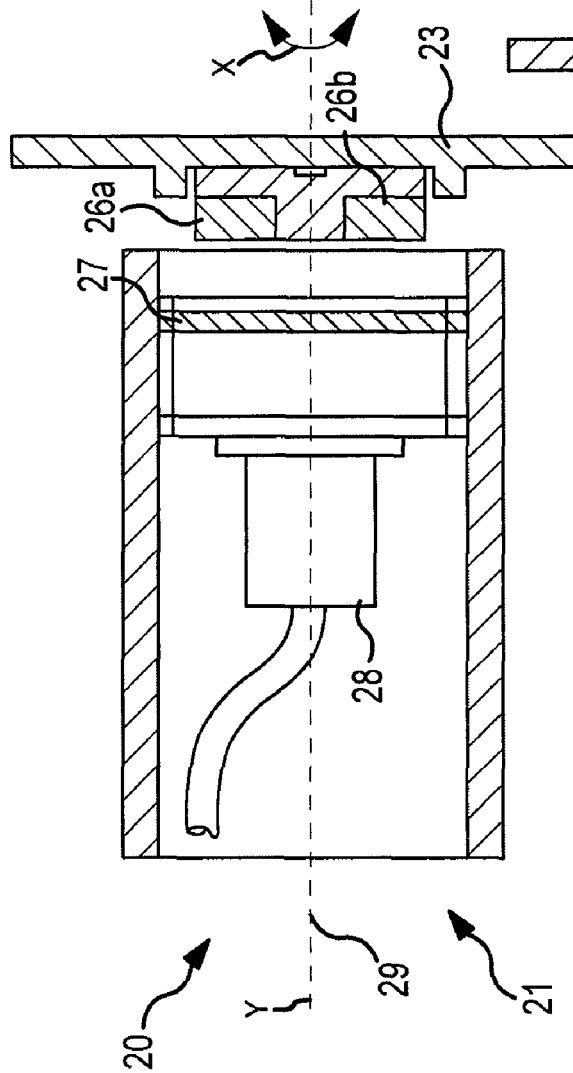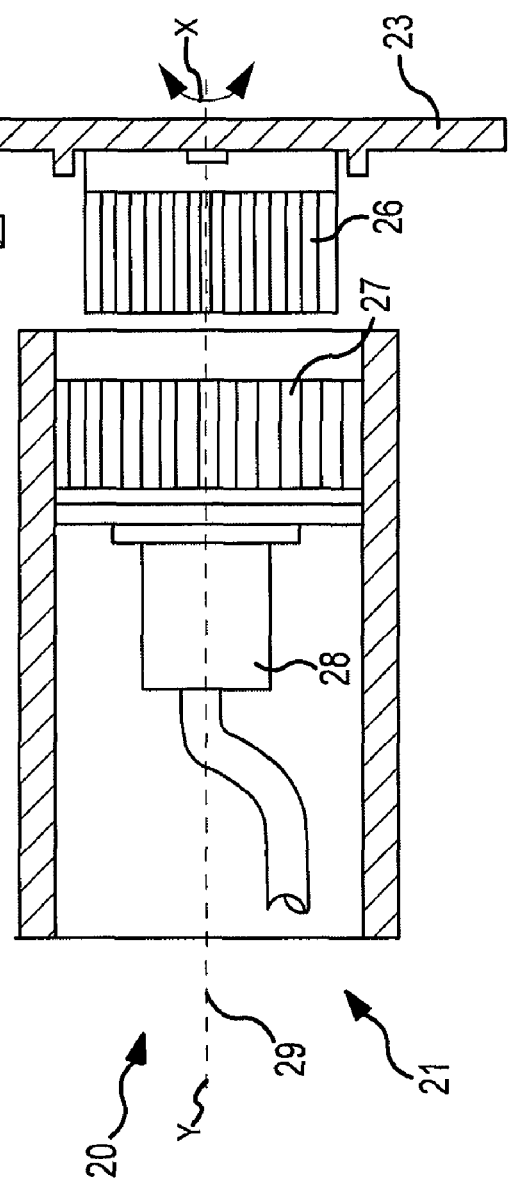

NON-CONTACT SENSOR SYSTEM AND METHOD FOR VELOCITY DETERMINATION

FIELD OF THE INVENTION

This invention generally relates to non-contact sensor systems, and more particularly, to inductive and capacitive non-contact sensor systems.

BACKGROUND OF THE INVENTION

Various types of sensors are used throughout aircraft to provide information about aircraft systems and operating conditions. Due in part to the harsh operating conditions to which aircraft are subjected, the sensors generally should be protected from these operating conditions. Examples of such harsh operating conditions are high shock, high vibration, high and low temperature extremes, humidity, wetness, dust, snow, and ice. These harsh operating conditions are further exacerbated by the high velocity at which aircraft travel. To account for these operating conditions, aircraft sensors are generally robustly constructed, often resulting in increased expense and weight. It is therefore desirable to reduce the cost and weight of such sensors without unacceptable loss in accuracy.

Additionally, many aircraft sensors have touching and/or moving parts. Contacts in the sensors that require physical connections for operation may wear out and become unreliable. Replacing these already expensive sensors results in even greater expense.

In other industries, non-contact sensors have been employed in response to some of the concerns associated with contact-based sensors. Because of factors such as those noted above, these non-contact sensors have not generally been used to replace contact-based sensors in aircraft. Instead, some prior aircraft brake wear systems have generally used visual inspection of a wear pin to determine the degree of brake wear that has occurred. Several disadvantages to visual inspection exist, including accuracy and timing of inspection. Thus, it is desirable to improve the accuracy of measurement and the timing of inspection.

SUMMARY OF THE INVENTION

A non-contact sensor system comprises, in one embodiment, a first sensor element and a rotary member disposed proximate the first sensor element without physically contacting the first sensor element. The rotary member may be configured to be rotated about an axis Y by a shaft configured to pass through the rotary member along the axis Y at a value X. The non-contact sensor system may further comprise a second sensor element disposed on the rotary member proximate the first sensor element without physically contacting the first sensor element, and the first sensor element and the second sensor element may be operatively coupled to facilitate sensing the value X.

In some embodiments, a control unit for an aircraft non-contact sensor system comprises a signal generator configured to produce a current in a first sensor element. The first sensor element may be operatively coupled to a second sensor element without physically contacting the second sensor element. In an embodiment, the control unit further comprises a calculator configured to determine a value X in response to a determination of a value Z associated with a rotary member disposed proximate the first sensor element. The rotary member is configured to be rotated about an axis Y by a shaft configured to pass through the rotary member along the axis Y at the value X, and the value Z is associated with the rotation of the rotary member about the axis Y.

Further, according to various embodiments, a computer readable medium may have stored thereon a plurality of instructions comprising instructions to generate a signal that causes a first current to flow in an electrical circuit in a first non-contact sensor element. A first electromagnetic field is generated in response to the signal, and the first non-contact sensor element is disposed proximate a second non-contact sensor element without physically contacting the second non-contact sensor element. The instructions may further comprise instructions to sense a second electromagnetic field by a sensing circuit in the first non-contact sensor element, the second electromagnetic field being generated in response to a second current flowing through a resonant circuit on the second non-contact sensor element. The second current is generated in response to the first electromagnetic field and the second non-contact sensor element is disposed on a rotary member that is configured to be rotated about an axis Y by a shaft configured to pass through the rotary member along the axis Y at a value X. The instructions may further comprise instructions to determine the value X in response to sensing the second electromagnetic field and in response to a value Z associated with the rotation of the rotary member about the axis Y.

Additionally, various embodiments provide a non-contact sensor system that comprises a first sensor element disposed within a first member having an axis Y, and a second member configured to rotate about the axis Y at a value X, wherein the second member is configured to interface with the first member. The non-contact sensor system may further comprise a second sensor element disposed on the second member proximate the first sensor element, without physically contacting the first sensor element, and the first sensor element and the second sensor element may be operatively coupled to facilitate sensing the value X.

Furthermore, various embodiments may provide a non-contact sensor system that comprises a first sensor element disposed on an outside surface of a chamber having an inside surface that is configured to receive a piston, the piston being configured to move a value X within the chamber, without physically contacting the first sensor element. The non-contact sensor system may further comprise a second sensor element disposed on the piston and separated by a wall of the chamber, and the first sensor element and the second sensor element being operatively coupled to facilitate sensing the value X.

Moreover, in accordance with various embodiments, a non-contact sensor system may comprise a first sensor element disposed on a stationary member, and a second sensor element disposed on a rotational member. The second sensor element is proximate the first sensor element, without physically contacting the first sensor element, and the rotational member is configured to facilitate selection of at least a first position and a second position. In such embodiments, the first sensor element and the second sensor element are operatively coupled to facilitate sensing of the selected position.

BRIEF DESCRIPTION OF THE DRAWING FIGURES

FIG. 1 illustrates a perspective view of a non-contact sensor system for measuring brake wear according to an embodiment;

FIG. 2 illustrates a perspective view of a second non-contact sensor system for measuring brake wear according to an embodiment;

FIG. 3 illustrates a cross-sectional view of a rotational member for use in a non-contact sensor system according to an embodiment;

FIG. 4 illustrates a cross-sectional view of a non-contact sensor system for measuring wheel rotation according to an embodiment;

FIG. 5 illustrates a cross-sectional view of a second non-contact sensor system for measuring wheel rotation according to an embodiment;

DETAILED DESCRIPTION

Figure 6:
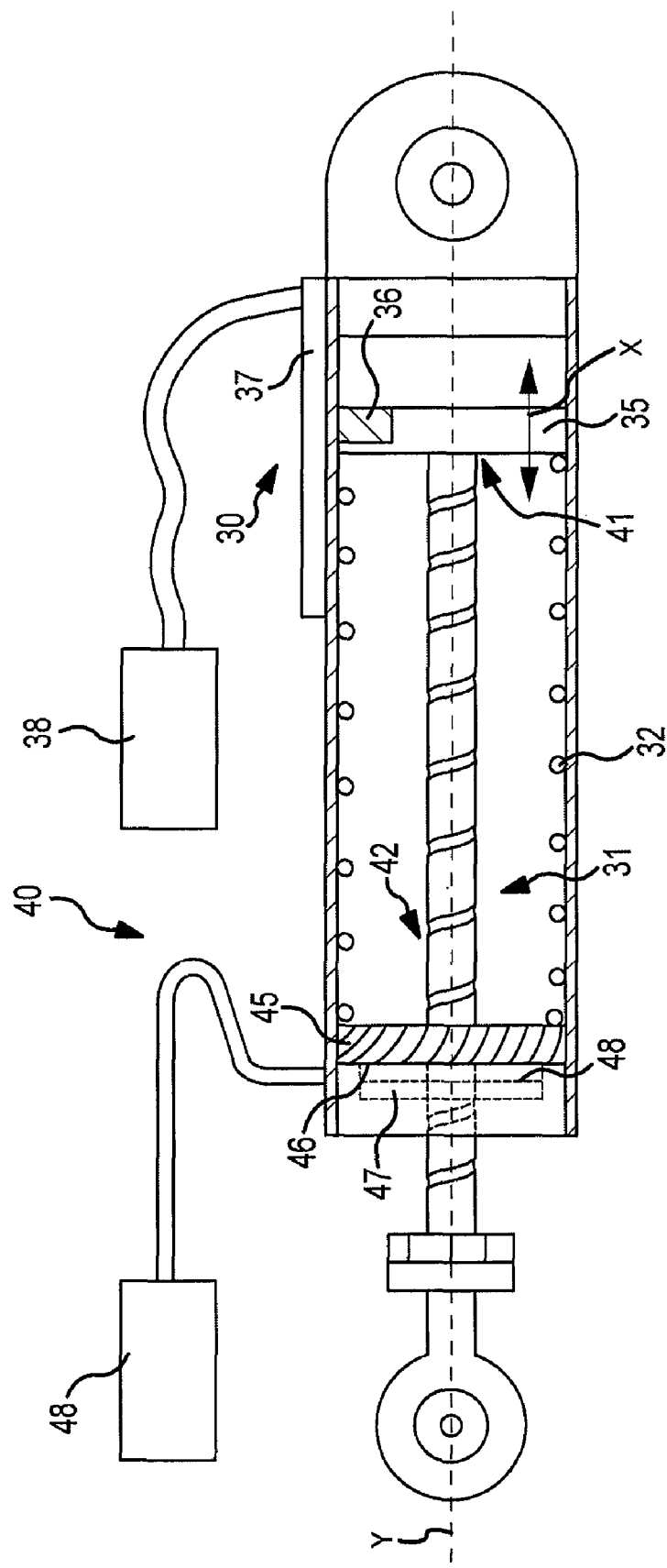
FIG. 6 illustrates a cross-sectional view of a non-contact sensor system for use with a pedal sensor according to various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical, electrical, and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Various embodiments provide a non-contact sensor system that comprises a first sensor element operatively coupled to a second sensor element without physically contacting the second sensor element. For example, the non-contact sensor system may use electromagnetism, magnetism, induction, and/or capacitance to create and/or modify an electromagnetic field between the first sensor element and the second sensor element in order to cause current to flow in the first sensor element and/or the second sensor element, without any physical connections between the first sensor element and the second sensor element. In various embodiments, any method of causing current to flow in the second sensor element in response to a current flowing in the first sensor element where the first sensor element does not physically contact the second sensor element is contemplated and within the scope of the present disclosure. Similarly, any sensor system configured to calculate position information based on a relative location of a first sensor element to a second sensor element, where the first and second sensor elements are not in physical contact with each other, is contemplated within the scope of the present disclosure.

The first sensor element, in various embodiments, comprises an electrical circuit that may be disposed, for example, on a printed circuit board that includes at least one electrically conductive track, coil, circuit element or the like. Further the electrical circuit may comprise standard electronic components not embodied on a printed circuit board and/or the electrical circuit may comprise an integrated circuit. The electrical circuit may comprise a plurality of circuits, such as an excitation circuit, a sensing circuit, or the like. At least a portion of the electrical circuit, for example, an excitation circuit, is configured to carry an excitation signal that in turn generates a first electromagnetic field. It should be noted that in various embodiments, the electrical circuit and/or portions thereof may be located in one place in the sensor system, or they may be located in separate places. For example, the excitation circuit may be located in one location, and the sensing circuit may be located in a separate location. The first electromagnetic field generated by the electrical circuit of the first sensor element is configured to induce a resonant current in a resonant circuit disposed on the second sensor element. The resonant current induced in the resonant circuit is configured to generate a second electromagnetic field, and the second electromagnetic field is configured to induce a sensing current in a sensing circuit that is part of the electrical circuit on the first sensor element. The electromagnetic coupling between the first sensor element and the second sensor element is configured to vary with the relative position of the second sensor element to the first sensor element, and the sensing current may thus be used to determine the relative position of the second sensor element to the first sensor element.

As noted above with respect to the first sensor element, in accordance with various embodiments, it should be understood that the first sensor element and the second sensor element may individually comprise a plurality of sensor elements. For example, the first sensor element may comprise two or more sensor elements, and/or the second sensor element may comprise two or more sensor elements. These sensor elements may be mounted respectively on a fixed member and a moveable member. In various embodiments, the fixed member and the moveable member may comprise active portions, for example, where the sensor elements are located, and they may comprise inactive portions, for example, where the sensor elements are not located. Various embodiments further comprise sensor systems where the fixed member and the moveable member may comprise only active portions, such that the fixed member is the first sensor element and the movable member is the second sensor element. Thus it should be understood that while various embodiments may be described with a sensor element being disposed on a fixed and/or movable member, in various embodiments the fixed and/or movable member may not be present, or the first sensor element and/or second sensor element may be present in the sensor system without being disposed on a fixed member and/or a movable member.

Further, it should be understood that while various embodiments may be disclosed as comprising single sensor elements, these sensor elements may comprise multiple sensor elements without departing from the scope of the invention. It should further be understood that any electrical circuit, now known or hereafter developed, that is capable of providing the functionality disclosed herein is contemplated within the scope of this disclosure.

According to various embodiments, a control unit may be used to generate the excitation signal. The control unit may further be configured to receive the sensing signal and perform signal conditioning operations to determine the relative position of the second sensor element to the first sensor element. As will be discussed further below, the control unit may also be configured to determine a value associated with an aircraft system in response to the relative position of the second sensor element to the first sensor element. A separate control unit may be used for each combination of the first sensor element and the second sensor element, or a single control unit may be used to determine a plurality of values associated with a plurality of aircraft systems in conjunction with a plurality of first and second sensor element combinations.

An aircraft brake wear measurement system, according to an embodiment, is configured to determine how much an aircraft brake has worn. The break wear is determined by measuring the displacement between the brake's pressure plate (which includes the brake wear sensor's reference point) and a piston housing. A wear pin is attached to the pressure plate and passes through a rotational member that comprises a second non-contact sensor element. The wear pin's geometry is configured to rotate the rotational member as the wear pin moves linearly with the pressure plate. The rotation of the rotational member is proportional to the linear movement of the brake's pressure plate.

With reference to FIGS. 1 and 2, a brake wear non-contact sensor system 10 according to an embodiment is configured to determine a distance traveled by a wear pin 12. Wear pin 12 is attached to a brake system pressure plate 11 that is configured to exert a controllable braking force on a brake stack. As the brake stack wears, the distance between pressure plate 11 and brake housing 13 increases.

Brake wear non-contact sensor system 10 further comprises a wear sensor 14 configured to be attached to brake housing 13. As illustrated in FIG. 2, wear pin 12 is configured to pass through brake housing 13, or, as illustrated in FIG. 1, wear pin 12 does not pass through brake housing 13. With momentary reference to FIG. 3, wear sensor 14 comprises a rotational member 15 configured to interface with wear pin 12, a rotational sensor element 16 disposed on rotational member 15, and a fixed sensor element 17 disposed proximate rotational sensor element 16 without physically contacting rotational sensor element 16 or rotational member 15. Fixed sensor element 17 is coupled via connector 18 to a control unit (not shown) that is configured to provide an excitation signal to fixed sensor element 17.

As the brake stack begins to wear, pressure plate 11 moves further from brake housing 13, and wear pin 12 is configured to cause rotational member 15 to rotate a rotational distance Z about an axis Y along which wear pin 12 is oriented. With momentary reference to FIG. 3, and according to various embodiments, wear pin 12 may comprise a helix 19, groove, flute, channel or the like that is configured to interface with a key 9 in rotational member 15. Such an interaction may be configured to convert the linear movement of wear pin 12 into a rotational movement of rotational member 15 about the axis Y. As rotational member 15 rotates, the relative position of rotational sensor element 16 to fixed sensor element 17 changes.

In accordance with an embodiment where fixed sensor element 17 comprises a printed circuit board, the control unit causes an excitation signal to flow through an excitation circuit, such as an excitation coil (e.g., an antenna included in a printed circuit board) in fixed sensor element 17. The excitation signal then causes a first electromagnetic field to form in response to the excitation signal flowing through the excitation coil. This first electromagnetic field is configured to be at a resonant frequency of rotational sensor element 16, and induces a current in rotational sensor element 16. This induced current in rotational sensor element 16 is configured to generate a second electromagnetic field, and the second electromagnetic field in turn is configured to induce a current in a sensing circuit, such as a sensing coil in fixed sensor element 17. This current is sensed by the control unit via connector 18, and the current is used to determine the relative position of fixed sensor element 17 to rotational sensor element 16. The relative position is then used to determine the rotational distance Z traveled by rotational sensor element 16 on rotational member 15. The amount of rotation is proportional to a linear distance X traveled by wear pin 12, and the control unit therefore is configured to determine the linear distance X traveled by wear pin 12 and the brake wear associated with linear distance X.

In accordance with various embodiments, rotational sensor element 16 may be located on one or more portions of rotational member 15. For example, rotational sensor element 16 may comprise a plurality of sensor elements disposed about the circumference of rotational member 15. Rotational sensor element 16 may further be disposed continuously about the circumference of rotational member 15. Further, various embodiments may provide that rotational sensor element 16 is configured to rotate about the axis Y without being disposed on rotational member 15, or rotational member 15 and rotational sensor element 16 may be configured to be the same component.

With reference to FIGS. 4 and 5, a non-contact wheel speed sensor system 20 according to an embodiment comprises a fixed sensor element 27 disposed within a wheel axle 21 configured to interface with a wheel hub 23. Wheel hub 23 is configured to rotate about an axis Y, and wheel axle 21 is configured to be aligned with the axis Y.

As illustrated in FIG. 4, a fixed sensor element 27 comprises a disk-shaped electrical circuit, for example, a disk-shaped electrical circuit board configured to be disposed across wheel axle 21, such that a vector normal to fixed sensor element 27 at any point is substantially parallel to axis 29 of wheel hub 23. In various configurations, wheel hub 23 comprises a rotational sensor element 26 has a normal vector substantially parallel to axis 29. Thus, in response to wheel hub 23 being engaged with axle 21, the sensing surfaces of fixed sensor element 27 and rotational sensor element 26 are substantially parallel to each other.

As illustrated in FIG. 5, fixed sensor element 27 comprises an electrical circuit, for example, a flexible flat circuit board disposed circumferentially against a wall of wheel axle 21 and about axis 29 of wheel hub 23. In such a configuration, wheel hub 23 comprises a rotational sensor element 26 that is disposed circumferentially against a wall of wheel hub 23 and about axis 29. Thus, in response to wheel hub 23 being engaged with wheel axle 21, the sensing surfaces of fixed sensor element 27 and rotational sensor element 26 are substantially equidistant from each other over the sensing surfaces. It should be understood that fixed sensor element 27 may comprise a plurality of fixed sensor elements disposed within wheel axle 21, and/or that rotational sensor element 26 may comprise a plurality of rotational sensor elements disposed on wheel hub 23.

With reference to both FIGS. 4 and 5, in various embodiments, the control unit is configured to cause an excitation signal to flow through an excitation circuit such as an excitation coil in fixed sensor element 27. The excitation signal may then be configured to cause a first electromagnetic field to form in response to the excitation signal flowing through the excitation coil. This first electromagnetic field is configured to be at a resonant frequency of rotational sensor element 26, and is configured to induce a current in rotational sensor element 26. This induced current in rotational sensor element 26 generates a second electromagnetic field, and the second electromagnetic field in turn induces a current in a sensing circuit, such as a sensing coil in fixed sensor element 27.

This current may then be sensed by the control unit via connector 28, and the current may be used to determine the relative position of fixed sensor element 27 to rotational sensor element 26 in order to determine a value X associated with the relative position about the axis Y. The relative position may thus used to determine the amount of rotation of wheel hub 23. Repeated position measurements may be used to determine a velocity and/or acceleration of wheel hub 23 about axis 29.

According to various embodiments, and with reference to FIG. 6, a non-contact pedal sensor is configured to determine the position of a pedal, for example, as used in an aircraft. FIG. 6 illustrates two non-contact pedal sensors 30, 40. It should be understood that in various embodiments, both non-contact pedal sensors 30, 40 may be present, or only one of non-contact pedal sensor 30 or non-contact pedal sensor 40 may be present. Both non-contact pedal sensors 30, 40 are illustrated in FIG. 6 for purposes of illustration and description of an embodiment.

In such embodiments, as the pedal moves, a piston assembly 41 is configured to move a distance X within a chamber 31, and a spring 32 is configured to maintain piston assembly 41 in a starting position if a force is not exerted on piston assembly 41. The relative position of piston assembly 41 within chamber 31 is used to determine a position of the aircraft pedal.

With continued reference to FIG. 6, in various embodiments, piston assembly 41 comprises a first sensor element, such as magnet 36 disposed on a piston head 35. On the outside of chamber 31, a fixed sensor element 37 is disposed over a distance sufficient to cover the total travel distance of piston head 35. Chamber 31 separates magnet 36 and fixed sensor element 37. Magnet 36 is configured to produce a electromagnetic field, and as piston assembly 41 moves, the electromagnetic field induces a current in a sensing circuit such as a sensing coil in fixed sensor element 46. The current induced may thus be used by the control unit, via transmission by connector 38, to determine a distance X traveled by piston head 35 and thus a relative position of piston head 35 to fixed sensor element 37 in order to determine the position of the aircraft pedal. It should be understood that while a magnet is disclosed, various embodiments of the invention comprise a second sensor element instead of a magnet, where the second sensor element is configured to be an active sensor element, such as a resonant circuit disclosed in other embodiments, and may be operatively coupled to the first sensor element via induction, capacitance, or the like.

In various embodiments, and with continued reference to FIG. 6, piston assembly 41 may comprise a piston shaft 42 that is configured to rotate a rotational member 47 about an axis Y in a manner similar to the rotation of rotational member 15 by wear pin 12 (discussed above). A fixed sensor element 46 is positioned on a fixed member 45 that is substantially parallel to rotational member 47. A rotational sensor element 48 is disposed on rotational member 47 without physically contacting fixed member 45 or fixed sensor element 46. As noted above, in various embodiments, fixed sensor element 46 may be disposed on only a portion of fixed member 45, fixed sensor element 46 may be configured to operate without fixed member 45, or fixed sensor element 46 may not be disposed on fixed member 45. Further, in various embodiments, rotational sensor element 48 may be disposed on only a portion of rotational member 47, or rotational sensor element 48 may be configured to operate without rotational member 47 (e.g., where rotational sensor element 48 is present in the sensor system without rotational member 47). According to various embodiments, the sensor system may comprise fixed sensor element 46 and/or rotational sensor element 48 without comprising fixed member 45 and/or rotational member 47.

The control unit, in accordance with various embodiments, is configured to cause an excitation signal to flow through an excitation circuit such as an excitation coil in fixed sensor element 46. The excitation signal causes a first electromagnetic field to form in response to the excitation signal flowing through the excitation coil. This first electromagnetic field is configured to be at a resonant frequency of rotational sensor element 48, and induces a current in rotational sensor element 48. This induced current in rotational sensor element 48 generates a second electromagnetic field, and the second electromagnetic field in turn induces a current in a sensing circuit (e.g., a sensing coil) in fixed sensor element 46.

This current is sensed by the control unit via connector 48, and is used to determine the relative position of fixed sensor element 46 to rotational sensor element 48. This relative position is used to determine the amount of rotation of rotational member 47. The amount of rotation is proportional to a linear distance X traveled by piston assembly 41, and the control unit therefore determines the linear distance X traveled by piston assembly 41 and the pedal position associated with that linear distance.

Figure 7:
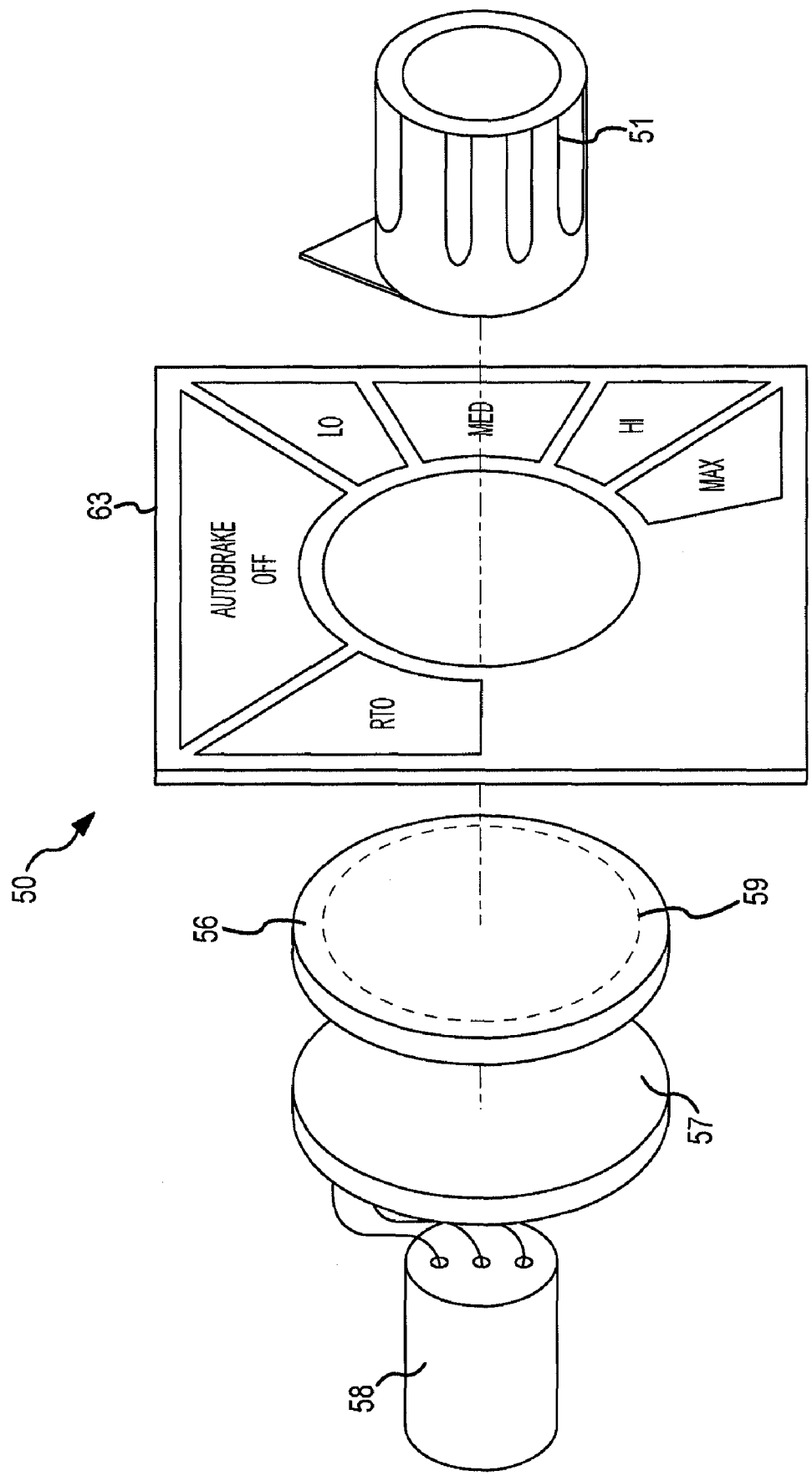
FIG. 7 illustrates a perspective view of a non-contact sensor system for use with an autobrake switch according to an embodiment.

With reference now to FIG. 7, an autobrake switch sensor 50 according to an embodiment is disclosed. Autobrake switch sensor 50 is configured to determine a position of knob 51, and knob 51 is configured to select a plurality of options. Knob 51 is configured to turn the autobrake off, and it is configured to select "LO," "MED," "HI," "MAX," or "RTO" options in connection with the autobrake.

It should be understood that in various embodiments, any number of selections may be made by a selection sensor. For example, knob 51 may be configured to select between two options, such as "ON" and "OFF." Knob 51 may further be configured to select between ten, or twenty, or more options. In accordance with various embodiments, a sensor may be configured to utilize a reconfigurable switch plate display 63, such that the sensor may be configured to sense two options with one switch plate display, and the sensor may be configured to sense more than two options in another switch plate display.

To facilitate sensing the selection, according to various embodiments, autobrake switch sensor 50 comprises a fixed sensor element 57 disposed proximate a rotational member 56 without physically contacting rotational member 56. Rotational member 56 comprises a rotational sensor element 59 that does not physically contact fixed sensor element 57. Rotational member 56 is configured to be connected to knob 51 with switch plate display 63 located between knob 51 and rotational member 56, such that when knob 51 rotates, rotational member 56 rotates, but switch plate display 63 remains stationary.

In an embodiment, autobrake switch sensor 50 is configured to sense a relative position of rotational sensor element 59 to fixed sensor element 57 and thereby determine the selection indicated by the position of knob 51 and rotational member 56. The control unit is configured to cause an excitation signal to flow through an excitation circuit such as an excitation coil in fixed sensor element 57. The excitation signal causes a first electromagnetic field to form in response to the excitation signal flowing through the excitation coil. This first electromagnetic field is configured to be at a resonant frequency of rotational sensor element 59 and to induce a current in rotational sensor element 59. This induced current in rotational sensor element 59 generates a second electromagnetic field, and the second electromagnetic field in turn induces a current in a sensing circuit (e.g., a sensing coil) in fixed sensor element 57. This current is sensed by the control unit via connector 58, and the current is used to determine the relative position of fixed sensor element 57 to rotational sensor element 59. The relative position is then used to determine the selection indicated by knob 51 and rotational member 56. It should be noted that in various embodiments, fixed sensor element 57 may be disposed on at least a portion of a fixed member. Further, according to various embodiments, rotational sensor element 59 may comprise a plurality of rotational sensor elements disposed on rotational member 56, or rotational sensor element 59 may function without rotational member 56, where rotational member 56 is not included as part of the sensor system.

In accordance with various embodiments, knob 51 may be configured to actuate fixed sensor element 57, rotational sensor element 59, and/or the control unit. For example, knob 51 may be rotated to a desired position, and then knob 51 may be pressed, pulled, and/or otherwise actuated to facilitate activating the sensor system. In response to knob 51 being pressed and/or pulled, for example, a current may be configured to flow through the excitation circuit in fixed sensor element 57.

Figure 8:
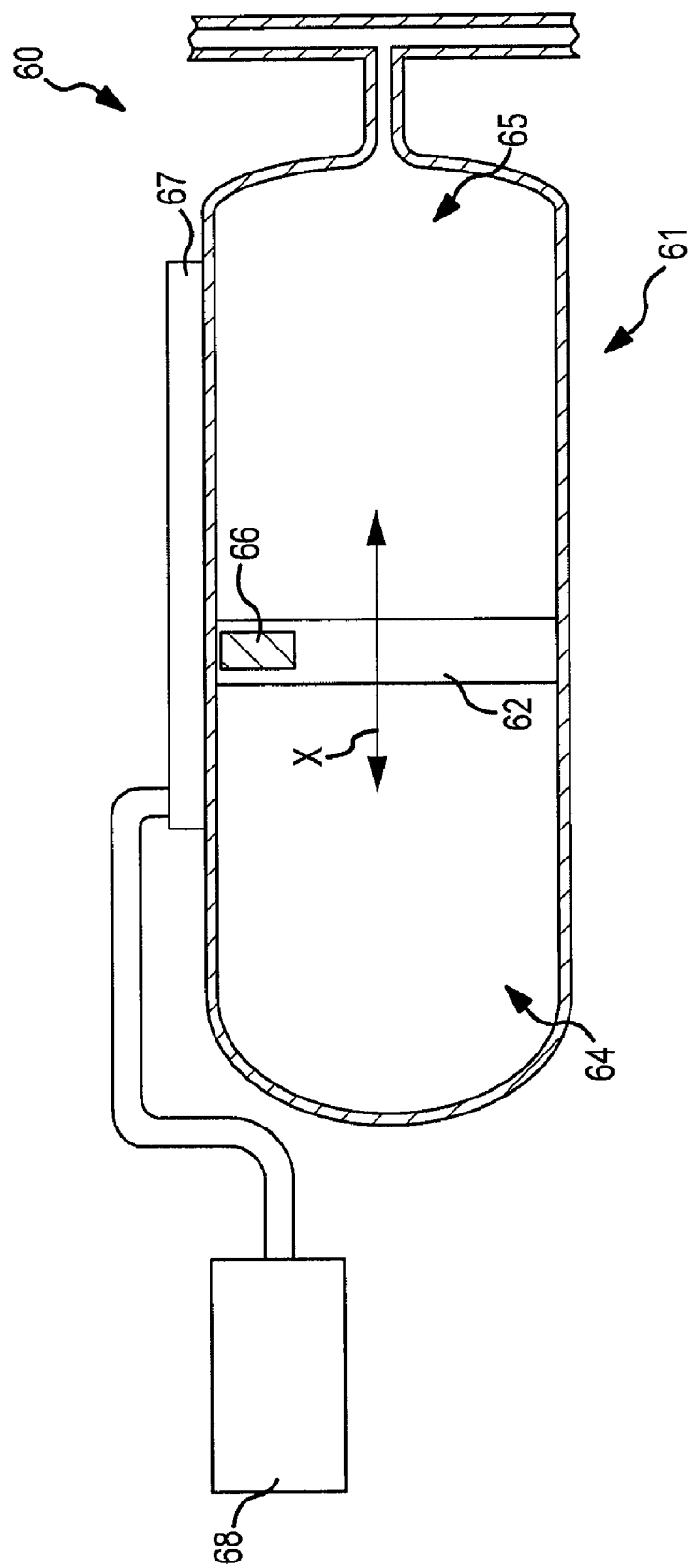
FIG. 8 illustrates a cross-sectional view of a non-contact sensor system for use with a hydraulic accumulator according to an embodiment.

In various embodiments, and with reference to FIG. 8, a hydraulic accumulator volume sensor system 60 is configured to determine an amount of available hydraulic fluid in hydraulic accumulator 61. A piston 62 is disposed in hydraulic accumulator 61, and is configured to separate a first section 64 from a second section 65. In an embodiment, first section 64 is configured to be filled with nitrogen, and second section 65 is configured to be filled with hydraulic fluid. As hydraulic fluid is utilized in an aircraft, the amount (e.g., a volume, weight, pressure, etc.) of hydraulic fluid available in hydraulic accumulator 61 is reduced, and piston 62 may move a distance X within accumulator 61. Determining the position of piston 62 within hydraulic accumulator 61 facilitates determination of the amount of hydraulic fluid available. In various embodiments, hydraulic volume sensor system 60 may be configured to be used within pressure-bearing vessels to facilitate sensing a volume within the pressure-bearing vessels.

Hydraulic accumulator volume sensor system 60 comprises a magnet 66 disposed on piston 62 proximate a wall of hydraulic accumulator 61. As noted previously, although a magnet is disclosed, it should be understood that various non-contact sensors described herein may be employed in addition to and/or instead of magnet 66. Hydraulic accumulator volume sensor system 60 further comprises a fixed sensor element 67 disposed outside of hydraulic accumulator 61 over a distance sufficient to cover the total travel distance of piston 62. Hydraulic accumulator 61 physically separates magnet 66 and fixed sensor element 67. Magnet 66 is configured to produce a electromagnetic field, and as piston 62 moves, the electromagnetic field is configured to induce a current in a sensing circuit (e.g., sensing coil) in fixed sensor element 67. The current induced is used by the control unit, via transmission by connector 68, to determine a relative position of piston 62 to fixed sensor element 67 and thereby facilitate determination of the available hydraulic fluid within hydraulic accumulator 61.

In various embodiments, the control unit may comprise a processor configured to control the various operations disclosed herein. Such processors are known in the art, and any processor now known or hereafter developed may be used to facilitate control of the control unit. Additionally, the control unit may further comprise a computer readable medium configured to provide instructions to the processor for carrying out the various operations disclosed herein. The computer readable medium may be embodied in any form readable by the processor that is now known or hereafter developed. Examples of such computer readable media are flash memory, solid state memory, magnetic discs (e.g., hard disks, floppy discs, and the like), and optical discs (e.g., compact discs, digital versatile discs, Blu-Ray discs, and the like).

The control unit, electronic circuits, integrated circuits, and the like disclosed herein, and in accordance with various embodiments, may comprise any electronic circuit configured to control the various operations disclosed herein. The electronic circuit may comprise any known electronic components (for example, transistors, capacitors, diodes, resistors, and the like) configured to perform the various calculations and/or determinations to determine position, displacement, velocity, acceleration, and the like, relating to the sensor elements and sensor systems disclosed herein. Such calculations may be performed and/or carried out with or without a general-purpose processor, software, or a computer readable medium. Such calculations may be performed and/or carried out with or without the use of an integrated circuit. It should be understood that any method for determining the various characteristics, outputs, readings, measurements, and the like, associated with the sensor elements and sensor systems disclosed herein, whether now known or hereafter developed, is contemplated within the scope of the present disclosure. For example, the various circuits disclosed herein may be configured to provide analog and/or digital signals (e.g., digital pulse output from the fixed sensor element to the control unit) for processing by the control unit.

Although various embodiments for a non-contact sensor system have been disclosed, it should be understood that the present disclosure is not limited to such applications. Various modifications will be apparent to one skilled in the art in order to adapt the non-contact sensor system disclosed herein to other applications, and such other applications are thus contemplated within the scope of the present disclosure.

In various embodiments, it may be desirable to determine a value X, such as a linear position of an object. For example, a shaft may be attached to the object, and as the object moves, the shaft causes a rotational member to rotate about an axis Y. One non-contact sensor element as disclosed herein may be attached to the rotational member, and another non-contact sensor element may be located proximate to the first non-contact sensor element without physically contacting the first non-contact sensor element. In various embodiments, the rotational sensor element and/or the fixed sensor element may be configured to function without the rotational member and/or the fixed member. Using the electromagnetism, capacitance, and/or induction principles discussed herein, a linear position of the object may be determined by determining the amount of rotation of the rotational member and a corresponding rotational distance Z traveled by the second non-contact sensor element. In some circumstances, it may also be desirable to determine the degree of rotation of the rotational member, or other rotating object, apart from a linear position of the object mentioned above.

Linear position of an object according to various embodiments may also be determined by affixing a magnet to a portion of the object or an element associated with the object. A non-contact sensor disclosed herein may then be positioned proximate the magnet without physically contacting the magnet. As the magnet moves with the object movement, the principles disclosed herein associated with the non-contact sensor element may be used to determine the relative position of the magnet to the non-contact sensor element, and thus be used to determine the linear position of the object.

In accordance with various embodiments, only one linear or rotational position is determined, though it should be understood that any number of calculations and/or values relating to the position determination may be determined in accordance with physical principles. For example, repeated linear position measurements may be used to determine linear velocity and/or linear acceleration of an object. Repeated rotational position measurements may be used to determine rotational velocity and/or rotational acceleration of an object. A volume, weight, mass, pressure, or the like determination may also be made where a linear position measurement indicates the position of a piston within a cylinder or other body. One skilled in the art will appreciate that any number of calculations and/or determinations may be made in accordance with principles disclosed herein.

Benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A non-contact sensor system, comprising:
    first sensor element disposed within a first member having an axis Y, the first sensor comprising an excitation circuit and a sensing circuit;
    a second member configured to rotate about the axis Y at a value X, wherein the second member is configured to interface with the first member; and
    a second sensor element disposed on the second member proximate the first sensor element without physically contacting the first sensor element, wherein the first sensor element and the second sensor element are operatively coupled to facilitate sensing the value X,
    wherein the excitation circuit generates a first magnetic field in response to an excitation signal,
    wherein the first magnetic field induces a current in the second sensor element,
    wherein the current induces a second magnetic field, and
    wherein the sensing circuit senses the second magnetic field.

2. The non-contact sensor system of claim 1, wherein the first member includes an axle and the second member includes a hub.

3. The non-contact sensor system of claim 2, wherein the value X includes a rotational position of the hub.

4. The non-contact sensor system of claim 2, wherein the value X includes a rotational velocity of the hub.

5. The non-contact sensor system of claim 2, wherein the value X includes a rotational acceleration of the hub.

6. The non-contact sensor system of claim 1, wherein the first sensor element is normal to the axis Y.

7. The non-contact sensor system of claim 1, wherein the second sensor element is normal to the axis Y.

8. The non-contact sensor system of claim 1, wherein the first sensor element comprises a disk-shaped integrated circuit board.

9. The non-contact sensor system of claim 1, wherein the first sensor element is disposed around an inside circumference of the first member.

10. The non-contact sensor system of claim 9, wherein the second sensor element is disposed about an outside circumference of the second member.

11. The non-contact sensor system of claim 10, wherein the second sensor element and the first sensor element are configured to be substantially parallel to each other in response to the second member interfacing with the first member.

12. The non-contact sensor system of claim 1, wherein the first sensor element comprises a flexible flat integrated circuit board.

13. The non-contact sensor system of claim 1, wherein the first sensor element is inductively coupled with the second sensor element.

14. The non-contact sensor system of claim 1, wherein the first sensor element is coupled in a capacitive manner with the second sensor element.

15. A control unit for a non-contact sensor system, comprising:
    a signal generator configured to produce a current in a first sensor element, wherein the first sensor element is operatively coupled to a second sensor element without physically contacting the second sensor element, the first sensor comprising an excitation circuit and a sensing circuit; and
    a calculator configured to determine a value of rotation X, wherein the first sensor element is disposed within a first member having an axis Y, and wherein the second sensor element is disposed on a second member configured to rotate about the axis Y at the value of rotation X, wherein the excitation circuit generates a first magnetic field in response to an excitation signal,
    wherein the first magnetic field induces a current in the second sensor element,
    wherein the current induces a second magnetic field, and
    wherein the sensing circuit senses the second magnetic field.

16. The control unit of claim 15, wherein the first magnetic field is configured to be at a resonant frequency of the second sensor element.

17. A non-transitory computer readable medium having stored thereon a plurality of instructions comprising:
    instructions to generate a signal that causes a first current to flow in a circuit in a first sensor element, wherein a first electromagnetic field is generated in response to the signal, and wherein the first sensor element is disposed proximate a second sensor element without physically contacting the second sensor element;

instructions to sense a second electromagnetic field in a sensing circuit in the first sensor element, wherein the second electromagnetic field is generated in response to a second current flowing through a resonant circuit on the second sensor element, wherein the second current is generated in response to the first electromagnetic field, wherein the first sensor element is disposed within a first member having an axis Y, and wherein the second sensor element is disposed on a second member configured to rotate about the axis Y at a value of rotation X; and instructions to determine the value of rotation X in response to the second electromagnetic field.

18. A method comprising:

generating a signal that causes a first current to flow in a circuit in a first sensor element, wherein a first electromagnetic field is generated in response to the signal, and wherein the first sensor element is disposed proximate a second sensor element without physically contacting the second sensor element;

sensing a second electromagnetic field in a sensing circuit in the first sensor element, wherein the second electromagnetic field is generated in response to a second current flowing through a resonant circuit on the second sensor element, wherein the second current is generated in response to the first electromagnetic field, wherein the first sensor element is disposed within a first member having an axis Y, and wherein the second sensor element is disposed on a second member that rotates about the axis Y at a value of rotation X; and determining the value of rotation X in response to the second electromagnetic field.

* * * * *